United States Patent
Juels et al.

(10) Patent No.: US 9,325,499 B1
(45) Date of Patent: Apr. 26, 2016

(54) MESSAGE ENCRYPTION AND DECRYPTION UTILIZING LOW-ENTROPY KEYS

(71) Applicant: EMC Corporation, Hopkinton, MA (US)

(72) Inventors: Ari Juels, Brookline, MA (US); Kevin D. Bowers, Melrose, MA (US)

(73) Assignee: EMC Corporation, Hopkinton, MA (US)

( * ) Notice: Subject to any disclaimer, the term of this patent is extended or adjusted under 35 U.S.C. 154(b) by 330 days.

(21) Appl. No.: 14/041,150

(22) Filed: Sep. 30, 2013

Related U.S. Application Data (60) Provisional application No. 61/838,557, filed on Jun. 24, 2013.

(51) Int. Cl.
*H04L 9/30* (2006.01)

(52) U.S. Cl.
CPC ........................ *H04L 9/30* (2013.01)

(58) Field of Classification Search
CPC ......... H04L 9/30; H04L 63/1416; H04K 1/10
See application file for complete search history.

(56) References Cited

U.S. PATENT DOCUMENTS

| | | | | | |
|---|---|---|---|---|---|
| 5,206,905 | A | * | 4/1993 | Lee | ................. G06F 3/0383 340/5.26 |
| 5,894,519 | A | * | 4/1999 | Clemot | ................. G06F 21/31 380/28 |
| 6,170,058 | B1 | * | 1/2001 | Kausik | ................. G06F 21/6245 705/71 |
| 7,328,350 | B2 | * | 2/2008 | Hird | ................. G06F 21/62 713/183 |
| 8,429,720 | B2 | | 4/2013 | Rajasekaran et al. | |

OTHER PUBLICATIONS

M. Bellare et al., "Format-Preserving Encryption," Selected Areas in Cryptography, Jan. 2009, pp. 295-312.
H. Bojinov et al., "Kamouflage: Loss-Resistant Password Management," 15th European Symposium on Research in Computer Security (ESORICS), Lecture Notes in Computer Science (LNCS), Sep. 2010, pp. 286-302, vol. 6345, Athens, Greece.
Joseph Bonneau, "Guessing Human-Chosen Secrets," PhD Thesis, University of Cambridge, Technical Report No. 819, May 2012, 163 pages.

(Continued)

*Primary Examiner* — William Goodchild
*Assistant Examiner* — Wasika Nipa
(74) *Attorney, Agent, or Firm* — Ryan, Mason & Lewis, LLP (57) ABSTRACT

In one embodiment, a first message is obtained and encrypted to produce a ciphertext. The first message is encrypted such that decryption of the ciphertext utilizing a first key yields the first message, and decryption of the ciphertext utilizing a second key different than the first key yields a second message that is distinct from the first message but shares one or more designated characteristics with the first message. Encrypting the first message may more particularly comprise mapping the first key to a first seed, mapping the first message to a second seed, determining an offset between the first and second seeds, and generating the ciphertext based on the determined offset. Such an arrangement prevents an attacker from determining solely from the second message if decryption of the ciphertext has been successful or unsuccessful. Other embodiments include decryption methods, apparatus for encryption and decryption, and associated articles of manufacture.

20 Claims, 3 Drawing Sheets

(56) References Cited

OTHER PUBLICATIONS

B.M. Bowen et al., "Automating the Injection of Believable Decoys to Detect Snooping," Third ACM Conference on Wireless Network Security (WiSec), Mar. 2010, pp. 81-86.

B.M. Bowen et al., "Baiting Inside Attackers Using Decoy Documents," Fifth International ICST Conference on Security and Privacy in Communication Networks (SecureComm), Sep. 2009, pp. 51-70, vol. 19.

R. Canetti et al., "Hardness Amplification of Weakly Verifiable Puzzles," Second International Conference on Theory of Cryptography (TCC), Lecture Notes in Computer Science (LNCS), Feb. 2005, pp. 17-33, vol. 3378.

A. Paes De Barros, "RES: Protocol Anomaly Detection IDS—Honeypots," http://seclists.org/focus-ids/2003/Feb/95, Feb. 2003, 2 pages.

Yevgeniy Dodis, "On Extractors, Error-Correction and Hiding All Partial Information," IEEE Information Theory Workshop on Theory and Practice in Information-Theoretic Security, Oct. 2005, pp. 74-79, Awaji Island, Japan.

Y. Dodis et al., "Fuzzy Extractors: How to Generate Strong Keys from Biometrics and Other Noisy Data," Advances in Cryptology—Eurocrypt, International Conference on the Theory and Applications of Cryptographic Techniques, Lecture Notes in Computer Science (LNCS), May 2004, pp. 523-540, vol. 3027, Interlaken, Switzerland.

Y. Dodis et al., "Entropic Security and the Encryption of High Entropy Messages," Second Theory of Cryptography Conference (TCC), Lecture Notes in Computer Science (LNCS), Feb. 2005, pp. 556-577, vol. 3378.

A. Juels et al., "Honeywords: Making Password-Cracking Detectable," Manuscript (v2.0), people.csail.mit.edu/rivest/honeywords, May 2013, pp. 1-19.

A. Juels et al., "A Fuzzy Commitment Scheme," Sixth ACM Conference on Computer and Communications Security (CCS), Nov. 1999, pp. 28-36, Singapore.

P.G. Kelley et al., "Guess Again (and Again and Again): Measuring Password Strength by Simulating Password-Cracking Algorithms," IEEE Symposium on Security and Privacy (SP), May 2012, pp. 523-537.

David Pogue, "Remember All Those Passwords? No Need," The New York Times, Jun. 5, 2013, 4 pages.

A. Russell et al., "How to Fool an Unbounded Adversary with a Short Key," Advances in Cryptology—EUROCRYPT, International Conference on the Theory and Applications of Cryptographic Techniques, Lecture Notes in Computer Science (LNCS), Apr.-May 2002, pp. 133-148, vol. 2332, Amsterdam, The Netherlands.

C.E. Shannon, "Communication Theory of Secrecy Systems," Bell System Technical Journal, Oct. 1949, pp. 656-715, vol. 28, No. 4.

M.G. Siegler, "One of the 32 Million with a RockYou Account? You May Want to Change All Your Passwords. Like Now." TechCrunch, http://techcrunch.com/2009/12/14/rockyou-hacked/, Dec. 2009, 5 pages.

M. Weir et al., "Password Cracking Using Probabilistic Context-Free Grammars," IEEE 30th Symposium on Security and Privacy (SP), May 2009, pp. 391-405.

Y. Zhang et al., "The Security of Modern Password Expiration: An Algorithmic Framework and Empirical Analysis," 17th ACM Conference on Computer and Communications Security (CCS), Oct. 2010, pp. 176-186.

Q. Zhao et al., "A Comparative Study on Quality Assessment of High Resolution Fingerprint Images," 17th IEEE International Conference on Image Processing (ICIP), Sep. 2010, pp. 3089-3092, Hong Kong, China.

T.A. Berson et al., "Secure, Keyed, and Collisionful Hash Functions," Technical Report SRI-CSL-94-08, SRI International Laboratory, 1993 (revised Sep. 1994).

\* cited by examiner

FIG. 2

```
function enc_κ^HE(m)

Inputs: message m ∈ M, key κ ∈ K
Output: ciphertext c = (δ, x)

if m ∈ M and κ ∈ K then
        x ⟵^U K̃;
        δ ⟵ ĝ^(-1)(m) - f_x(κ);
        output (δ, x)
    else
        output ⊥
```

FIG. 3

```
function dec_κ^HE(c)

Inputs: ciphertext c = (δ, x), key κ ∈ K
Output: message m ∈ M if κ ∈ K, x ∈ K̃ and δ ∈ S
        output g(f_x(κ) + δ)
    else
        output ⊥
```

FIG. 4

KEYS  SEEDS  MESSAGES

MESSAGE ENCRYPTION AND DECRYPTION UTILIZING LOW-ENTROPY KEYS

PRIORITY CLAIM

The present application claims the priority of U.S. Provisional Patent Application Ser. No. 61/838,557 filed Jun. 24, 2013, which is incorporated by reference herein.

FIELD

The field relates generally to cryptography, and more particularly to techniques for encryption and decryption of messages.

BACKGROUND

Many real-world systems rely on passwords, biometrics or other low-entropy keys for user authentication. In the case of passwords, the general user population produces passwords having an average entropy of about 20 bits. Biometrics also exhibit similarly low entropy. For example, even a high-resolution fingerprint reader has a false acceptance rate on the order of 1:1,000,000, implying less than 20 bits of entropy.

In typical online settings, an authentication server can supplement such low-entropy keys with contextual information to strengthen access-control decisions and can throttle guessing attempts by an adversary. Thus, low-entropy keys often provide adequate security in such settings. However, low-entropy keys are also used to control access to protected resources in offline settings that do not include enhanced protections of the type described above. For example, such keys may be used in encryption applications such as encryption of password vaults, documents, signing keys and other types of information. In the case of a password vault, the vault stores multiple passwords in encrypted form using a master password. Compromise of the master password gives the attacker immediate access to multiple valid passwords stored in the vault. Similar security issues can arise in other encryption contexts.

Accordingly, a need exists for encryption and decryption techniques that can provide improved security in a variety of different contexts, and particularly when utilizing low-entropy keys.

SUMMARY

Illustrative embodiments of the present invention provide techniques for encryption and decryption that exhibit enhanced security relative to conventional arrangements when utilizing passwords and other low-entropy keys.

In one embodiment, a first message is obtained and encrypted to produce a ciphertext. The first message is encrypted such that decryption of the ciphertext utilizing a first key yields the first message, and decryption of the ciphertext utilizing a second key different than the first key yields a second message that is distinct from the first message but shares one or more designated characteristics with the first message. Encrypting the first message may more particularly comprise mapping the first key to a first seed, mapping the first message to a second seed, determining an offset between the first and second seeds, and generating the ciphertext based on the determined offset. Such an arrangement prevents an attacker from determining solely from the second message if decryption of the ciphertext has been successful or unsuccessful. Other embodiments include decryption methods, apparatus for encryption and decryption, and associated articles of manufacture.

The first and second keys may comprise respective valid and invalid low-entropy keys, such as respective valid and invalid passwords.

Decryption of the ciphertext utilizing respective ones of a plurality of additional keys different than the first key illustratively yields respective additional messages that are distinct from the first message but share designated characteristics with the first message in a manner that prevents an attacker from determining solely from a given one of the additional messages if decryption of the ciphertext has been successful or unsuccessful.

Moreover, an increase in a maximum number of such additional messages does not require any increase in a size of the ciphertext.

The ciphertext in some embodiments comprises an offset between a first seed associated with the first message and another seed generated by applying a key-to-seed mapping to the first key. For example, the ciphertext may be of the form $(\delta, x)$ where $\delta = \hat{g}^{-1}(m) - f_x(\kappa)$ denotes the offset, m denotes the first message, $\hat{g}^{-1}(m)$ denotes a message-to-seed mapping, $f_x(\kappa)$ denotes the key-to-seed mapping and x denotes a supplementary key utilized by the key-to-seed mapping. Other ciphertext formats may be used in other embodiments.

One or more embodiments are configured such that the first message comprises a valid password vault comprising a plurality of passwords, the first key comprises a master password of the password vault and the second message comprises an invalid password vault that is configured to appear valid to an attacker.

Other embodiments can be configured such that the first message comprises a permutation utilized to map passwords to accounts in a password vault, the first key comprises a master password of the password vault and the second message comprises an invalid permutation that is configured to appear valid to an attacker.

In still other embodiments, the first message may comprise, for example, a template utilized to generate multiple invalid password vaults, or a key utilized to select a password from a password space.

Embodiments of the invention can be implemented in a wide variety of different contexts involving encryption or decryption based on low-entropy keys. Also, other embodiments can be configured to utilize other types of keys. Accordingly, while particularly useful in the context of low-entropy keys, the disclosed techniques can be adapted in a straightforward manner for use with other types of keys.

BRIEF DESCRIPTION OF THE DRAWINGS

FIGS. 2 and 3 illustrate respective encryption and decryption processes implemented in the communication system of FIG. 1.

DETAILED DESCRIPTION

Illustrative embodiments of the present invention will be described herein with reference to exemplary systems and associated processing devices. It is to be appreciated, however, that the invention is not restricted to use with the particular illustrative system and device configurations shown. Accordingly, the term "communication system" as used herein is intended to be broadly construed, so as to encompass, for example, systems comprising only a single processing device, systems in which multiple processing devices communicate with one another over a network or other connection, and numerous other system types and configurations.

Figure 1:
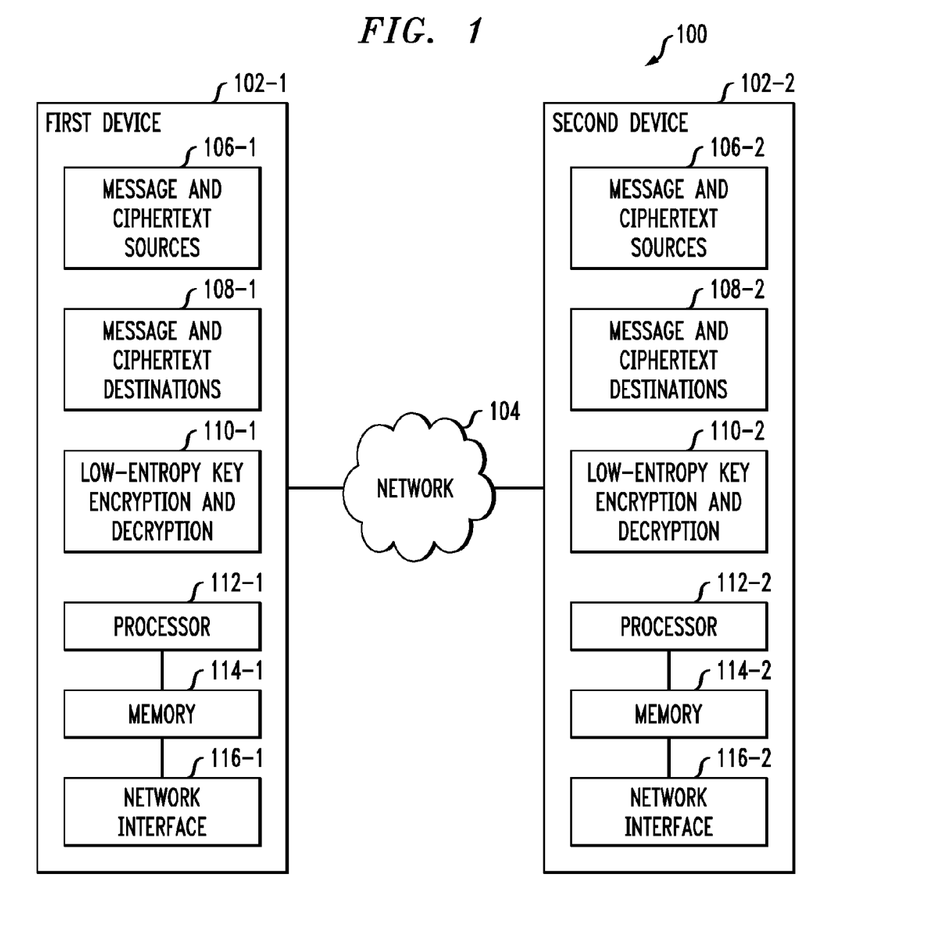
FIG. 1 is a block diagram of a communication system incorporating encryption and decryption functionality using low-entropy keys in an illustrative embodiment of the invention.

FIG. 1 shows a communication system 100 that incorporates encryption and decryption functionality using low-entropy keys such as passwords. The system 100 comprises first and second devices 102-1 and 102-2 that are configured to communicate with one another over a network 104.

The first and second devices 102 may comprise user devices such as, for example, mobile telephones, laptop or tablet computers, desktop computers, gaming consoles or other types of user devices as well as various combinations of multiple distinct devices. Each such device may be associated with a corresponding user, where "user" as the term is applied herein should be generally construed so as to encompass, for example, a human user or an associated hardware or software entity. Numerous alternative arrangements are possible.

The network 104 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

Each user device is configured to encrypt messages received from message sources to generate ciphertexts that are delivered to ciphertext destinations, and to decrypt ciphertexts received from ciphertext sources to generate messages for delivery to message destinations. The messages are also referred to herein as plaintexts, and may comprise any type of data or other information that it may be desirable to encrypt in a given encryption application. For example, in some embodiments disclosed herein, a message may comprise a password vault. A wide variety of other types of messages may be encrypted and decrypted using the techniques disclosed herein.

The user device 102-1 more particularly comprises message and ciphertext sources 106-1, message and ciphertext destinations 108-1, and an encryption and decryption module 110-1 that operates using at least one low-entropy key. The user device 102-2 is similarly configured to comprise message and ciphertext sources 106-2, message and ciphertext destinations 108-2, and an encryption and decryption module 110-2 that operates using at least one low-entropy key. The term "low-entropy key" as used herein is intended to comprise a key having on the order of 20 bits or less of entropy, although other types of keys may be used in other embodiments.

The encryption and decryption modules 110 are each configured to implement both encryption and decryption functionality, illustratively utilizing the respective encryption and decryption processes to be described below in conjunction with respective FIGS. 2 and 3. However, in other embodiments, a given device may be configured with only encryption functionality, or only decryption functionality.

Also, the source for a given message to be encrypted does not necessarily reside on the device that encrypts that message, but may instead reside on another device. Similarly, the source for a given ciphertext to be decrypted does not necessarily reside on the device that decrypts that ciphertext, but may instead reside on another device. Thus, for example, the first device 102-1 may serve as a source of ciphertexts to be decrypted by the second device 102-2, and vice versa. Similarly, the first device 102-1 may serve as a source of messages to be encrypted by the second device 102-2, and vice versa.

The first and second devices 102 in the FIG. 1 embodiment are implemented as respective processing devices. Each such processing device generally comprises at least one processor and an associated memory, and implements one or more functional modules for controlling certain features of the system 100.

The first device 102-1 comprises a processor 112-1 coupled to a memory 114-1 and a network interface 116-1. Similarly, the second device 102-2 comprises a processor 112-2 coupled to a memory 114-2 and a network interface 116-2.

Each of the processors 112 may comprise a microprocessor, a microcontroller, an application-specific integrated circuit (ASIC), a field-programmable gate array (FPGA) or other type of processing circuitry, as well as portions or combinations of such circuitry elements.

Each of the memories 114 may comprise random access memory (RAM), read-only memory (ROM) or other types of memory, in any combination. The memories 114 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

The network interfaces 116 allow their respective devices 102 to communicate over the network 104 with one another and possibly with other devices not explicitly shown, and may comprise one or more conventional transceivers.

The encryption and decryption modules 110 of the devices 102 may be implemented at least in part in the form of software that is stored in respective ones of the memories 114 and executed by respective ones of the processors 112.

It is to be appreciated that the particular set of elements shown in FIG. 1 for providing encryption and decryption functionality is presented by way of example, and in other embodiments additional or alternative elements may be used. Thus, another embodiment may include additional networks and additional sets of devices as well as other system components of a type commonly used in conjunction with encryption and decryption functionality.

Examples of such conventional components and associated cryptographic processes are disclosed in A. J. Menezes et al., Handbook of Applied Cryptography, CRC Press, 1997, which is incorporated by reference herein.

As mentioned previously, various elements of system 100 such as modules 110 associated with respective first and second devices 102 may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, storage devices or other types of processing devices.

A processing platform utilized in one or more embodiments may include cloud infrastructure comprising virtual machines (VMs) and one or more associated hypervisors. An example of a commercially available hypervisor platform that may be used to implement portions of the system 100 is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the system 100.

In the present embodiment, the modules 110 each implement a simple and efficient process for encrypting messages using low-entropy keys such as passwords. The encryption process in this embodiment produces a ciphertext which, when decrypted with any of a number of incorrect keys, yields plausible-looking but invalid messages. The invalid message may be made to appear plausible, for example, by generating it from a message distribution statistically similar to that of the valid message. Consequently, an attacker cannot determine whether a given message obtained by decrypting the ciphertext is a valid message or an invalid message.

This embodiment is an example of an arrangement in which a first message is encrypted such that decryption of the ciphertext utilizing a first key yields the first message and decryption of the ciphertext utilizing a second key different than the first key yields a second message that is distinct from the first message. Moreover, the second message shares one or more designated characteristics with the first message in a manner that prevents an attacker from determining solely from the second message if decryption of the ciphertext has been successful or unsuccessful. The one or more designated characteristics shared by the first and second messages may result from drawing the messages from similar distributions, or may be based on other features, such as similarity in appearance, configuration, format or content.

An important benefit of this encryption process is that it exhibits storage efficiency, in that the ciphertext size is constant in the number of invalid messages, and little larger in practice than a conventional ciphertext. Accordingly, the encryption process requires only constant storage for an essentially arbitrarily large set of invalid messages. Such storage efficiency is particularly important to ensuring fast synchronization among devices, but also to protecting large messages (e.g., e-mail archives).

The encryption process can be used, for example, to protect password vaults, such that an attacker that guesses an incorrect master password still obtains valid-seeming vault contents, and therefore cannot determine the true contents through offline attack alone.

Another advantage of the encryption process in this context is that knowledge of the valid message allows a party to detect invalid messages without knowledge of any additional secrets. For example, a service provider can with high probability detect the submission of a password resulting from incorrect vault decryption, but need not share any secrets with the user apart from the password itself.

The encryption process is simple to implement and efficient in terms of both storage and computation, and useful in a wide range of applications.

In the present embodiment, the encryption process is a symmetric-key encryption process, but other embodiments include public-key variants.

It is assumed that keys come from a space K, such as $K=\{0,1\}^l$, for security parameter l, i.e., l-bit strings, or $K=\{0,1\}^*$, i.e., bitstrings of arbitrary length, a possible representation of all passwords.

The encryption process encrypts plaintexts from a message space M. For simplicity, it is assumed that M is of finite size, although generalization to a message space of infinite size is also possible. There is a corresponding space of ciphertexts C.

In the present embodiment, the encryption is more particularly referred to as honey encryption (HE) and the invalid messages may be referred to as "honeywords," "honeytokens" or more generally "honeymessages." Associated with the encryption process is a corresponding decryption process.

This embodiment more particularly configures each of the modules 110 to utilize a pair of encryption and decryption functions ($enc^{HE}, dec^{HE}$):

$$c \leftarrow enc_\kappa^{HE}(m) \text{ and}$$

$$m \leftarrow dec_\kappa^{HE}(c),$$

where message $m \in M \cup \bot$ and ciphertext $c \in C \cup \bot$. The special symbol $\bot$ here indicates an encryption or decryption failure. These functions are illustrated in more detail in FIGS. 2 and 3, respectively.

An HE ciphertext may be decrypted not just using a unique correct key $\kappa$, but any of a variety of different, invalid keys from the key space K. Decryption with an invalid key $\kappa' \neq \kappa$ outputs a plaintext $m' \in M$ such that $m \neq m'$. Thus decryption failures may in some cases yield not the failure symbol $\bot$, but invalid plaintexts in the form of honeymessages.

In some embodiments, the message space M comprises the space of bitstrings of some fixed length, although in other embodiments the message space M may assume a more specialized format.

Additionally, HE may be configured to operate on messages from a specific, probabilistic source, such as messages generated by a population of users interacting with a software application. A good HE implementation should output honeymessages that are plausible source messages. Accordingly, honeymessages should be generated by an algorithm or sampled from a probability distribution that accurately models source messages. Thus, good functions $enc^{HE}$ and $dec^{HE}$ require a good choice of message-generation function to output plausible messages under incorrect decryption keys. We denote this function, whose use and construction we detail below, by g.

For instance, an ordinary user rarely employs the English word "supercalifragilisticexpialidocious" in everyday communications. An HE process for e-mail messages with a good message-generation function g would rarely output a honeymessage (e.g., bogus e-mail message) containing this word. A common word like "super," though, might appear relatively frequently in g's output honeymessages.

While HE is itself a cryptographic primitive, approximating the distribution of source messages, i.e., crafting g, is often a statistical modeling problem. HE may thus be viewed as an interface between cryptography and statistical approaches to creating deceptive data.

An exemplary construction of the functions ($enc^{HE}, dec^{HE}$) will now be described in greater detail.

It was noted above that the HE process in the present embodiment relies on a message-generation algorithm g to generate messages pseudorandomly in M. This algorithm takes as input a seed from a space S. Thus it is a function of the form:

$$g(s)=m,$$

for $s \in S$ and $m \in M$. We can also think of g as a function for sampling the message space M given a source of seeds.

Example 1. Consider an algorithm g for generation of a living person's age in the United States. We might let the message space M be the set of values [0,120] and a seed take the form of a value (e.g., probability) $s \in (0,1]$.

One possible algorithm g(s) maps s uniformly over the range [1,120], i.e., output ⌊s×121⌋. Of course, ages aren't distributed uniformly in the U.S. population. So g isn't a good approximation to the source probability distribution d. As a refinement, g might draw on the distribution of ages as reported by the U.S. census. For example, according to the 2010 U.S. census, 6.5% of U.S. inhabitants are aged 30-34. So g might map some interval of size 0.065 in s uniformly over the integer range [30,34], and other age ranges similarly.

A good sampling algorithm g generates plausible-looking source messages. More formally, the property we would like of g(s) for $s \in_U S$ selected uniformly at random is that it yields a message distribution close to message source d.

The exemplary constructions described below assume that the set of seeds S is an algebraic group. We use '+' to denote the group operation on elements of S. It is also assumed that g is efficiently invertible. As g may not be a bijection, however, $g^{-1}(m)$ may be a set of seeds that map to m, rather than a unique seed s. We thus let $\hat{g}^{-1}(m)$ denote an efficient algorithm that selects a seed $s \in_U g^{-1}(m)$, i.e., $\hat{g}^{-1}(m)$ makes a uniformly random selection. Other options can work too, e.g., picking the smallest-valued element from $g^{-1}(m)$ according to some ordering of M.

In some cases, simplified HE embodiments are possible in which S=M. The message space M need not always have a convenient algebraic-group representation.

In the constructions to be described, it may be helpful to consider g as sampling probability distributions, and thus for seeds to include reals in [0,1). In practice, such reals may be expressed as fixed-precision floating point values. A simple additive group then is one with "wraparound" in that from the sum or difference of two such reals, only the mantissa is retained.

HE also makes use of a key-to-seed mapping function $f$ that maps a symmetric key κ to a seed s. Intuitively, $f$ may be viewed as a way of "smoothing" the entropy in κ over the seed space S. The key-to-seed mapping function $f$ takes a supplementary key x, and thus has the form:

$$f_x(\kappa) \to s,$$

for $\kappa \in K$, $x \in \tilde{K}$, and $s \in S$. Here the key space $x \in \tilde{K}$ from which the supplementary key x is selected may be a different key space than that from which the key κ is selected. In our constructions, $x \in_U \tilde{K}$ is selected independently for each encryption operation and appended to the resulting ciphertext, although other arrangements may be used.

One possible choice of $f$ is a universal hash function. Cryptographic alternatives are also convenient. If seeds are short (e.g., of bit length at most l), then a simple way to construct $f_x(\kappa)$ is to compute $enc_x(\kappa)$ where enc denotes a pseudorandom permutation (PRP), which may be implemented using a block cipher such as AES. If seeds are long, x can be partitioned into multiple keys, each for a distinct PRP invocation.

Figure 2:
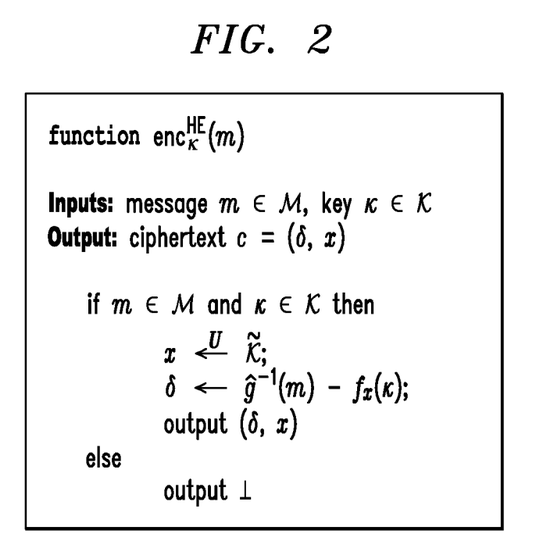

FIG. 2 shows the encryption function $enc^{HE}$, more specifically denoted $enc_\kappa^{HE}(m)$. It takes as inputs message $m \in M$, key $\kappa \in K$, and generates as an output ciphertext $c=(\delta,x)$. More particularly, if $m \in M$ and $\kappa \in K$ then $x \xleftarrow{U} \tilde{K}$, $\delta \leftarrow \hat{g}^{-1}(m) - f_x(\kappa)$ and $(\delta,x)$ is output. Otherwise the failure indicator ⊥ is output.

In this embodiment, a ciphertext may be viewed not as a string, but as a function $c:K \to M$ that maps keys to messages. This mapping is constructed by composing the key-to-seed mapping $f_x$ with the seed-to-message mapping $\hat{g}$.

To ensure correct decryption, it must be the case that c maps κ to m, i.e., $c(\kappa)=m$. The two constituent mappings $f_x$ and $\hat{g}$, therefore, are likely with high probability to be misaligned, in the sense that $\hat{g}(f_x(\kappa)) \neq m$.

To correct this misalignment, ciphertext c includes an offset δ. Specifically, $\delta = s - s_\kappa$, where $s_\kappa = f_x(\kappa)$, the seed generated by κ under $f_x$, and $s = \hat{g}^{-1}(m)$, a seed for m. The function c, then is:

$$c(\kappa') = \hat{g}(f_x(\kappa') + \delta).$$

In the following description, we denote ciphertexts interchangeably by c or (δ,x).

Figure 3:
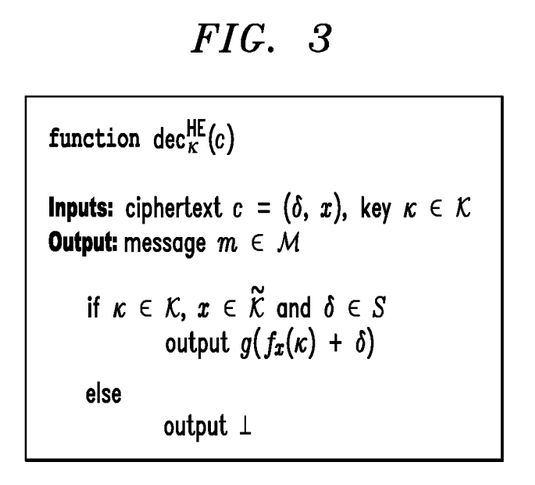

FIG. 3 shows the decryption function $dec^{HE}$, more specifically denoted $dec_\kappa^{HE}(c)$. The function takes as its inputs the ciphertext $c=(\delta,x)$ and the key $\kappa \in K$, and generates as its output the message $m \in M$. More particularly, if $\kappa \in K$, $x \in \tilde{K}$ and $\delta \in S$, the function outputs $g(f_x(\kappa)+\delta)$, and otherwise outputs the failure indicator ⊥.

A ciphertext $c=(\delta,x)$ is decrypted with key κ' by computing its corresponding seed $s_{\kappa'}=f_x(\kappa')$, applying offset δ to obtain s', and then generating message $m'=g(s')$.

Observe that $g(f_x(\kappa)+\delta)=g(s_\kappa+(s-s_\kappa))=g(s)=m$. That is, c always decrypts correctly to m with key κ.

Example 2. Continuing Example 1, suppose that we wish to encrypt the age A=60 of a U.S. inhabitant under a password κ="Boomer!".

Recall from Example 1 that a seed is a probability $s \in [0,1)$. So $f$ maps passwords pseudorandomly into [0,1). Suppose that $f$(Boomer!)=0.100.

In Example 1, g maps a seed s uniformly onto ages in [0,120], i.e., g(s)=s/121. We might obtain $\hat{g}^{-1}(A)$=A/121=0.496. So δ=0.496−0.100=0.396.

Suppose that seed values in [0,1) are expressed with three-digit precision. Then if $f$ is well constructed and distributes passwords uniformly over S, for each of the 1000 seeds $s \in S$, there will be many passwords, even short ones, that map onto s. So given a ciphertext δ and no knowledge of a user's password, in the view of an adversary every age in [0,120] is a possible plaintext.

Figure 4:
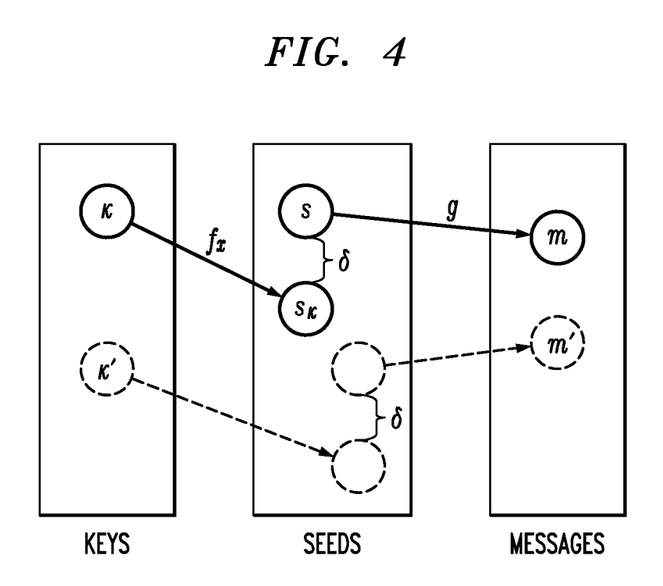
FIG. 4 shows exemplary key-to-seed and seed-to-message mappings in an illustrative embodiment.

FIG. 4 illustrates decryption of ciphertext c=(δ,x) with an HE process to yield corresponding, correct plaintext m. A correct key κ is mapped to seed $s_\kappa$ by $f_x$. Applying offset δ then yields seed s, which maps under g to correct plaintext m. Under the same decryption process, an incorrect key κ' yields a different, bogus plaintext message m'.

Rather than treating g as a message generation function, we may take a complementary view of $\hat{g}^{-1}$ as an invertible randomness extractor having g as its inverse.

An extractor ext(m,I) takes as input a source value m drawn from some probability distribution d, and a short random string I. It outputs a value $s \in S$, for algebraic group S. The key property of a good extractor is that the output s=ext(M;I) is close to uniformly distributed over S. An invertible extractor is one for which it is possible to reconstruct m from s and I.

In the exemplary construction described above, the extractor $ext=\hat{g}^{-1}(m)$ selects a value uniformly at random from $g^{-1}(m)$ and thus implicitly uses a supplementary random string I to make this selection. It should be noted, however, that it isn't necessary to store I to compute g(s).

For key κ, then, it is possible to treat $f_x(\kappa)$ as an encryption pad and compute a ciphertext $c=(\delta,x)$ on m where $$\delta = ext(m;I) - f_x(\kappa)$$

$$= \hat{g}^{-1}(m) - f_x(\kappa).$$

Application of pad $f_x(\kappa)$ may be viewed as a form of information-theoretically secure encryption. Classical application of pads for encryption over bitstrings uses ⊕, i.e., XOR, instead of '−'. In fact, $ext(m;I) - f_x(\kappa)$ may itself be viewed as an invertible extractor with "seed" (I,x,κ).

Suppose that $f_x$ is collision-free, i.e., $f_x(\kappa) \neq f_x(\kappa')$ for $\kappa \neq \kappa'$, and ext is an ideal extractor, i.e., its outputs for source distribution d are uniformly distributed over S. Then we have the property $H_\infty[m|c]=H_\infty[\kappa]$, where $H_\infty(A)=-\log(\max_a(\text{pr}[A=a]))$ denotes "guessing entropy." In other words, it is as hard to guess the plaintext m from the ciphertext c as it is to guess the key $\kappa$. It should be noted that ext need not be an ideal or even close-to-ideal extractor.

As an information-theoretic process, HE in illustrative embodiments relies for security upon statistical concealment of m, rather than computational intractability assumptions.

Some HE constructions may be configured such that the ciphertext c yields only some outputs in M as honeymessages, but not all. Placing a bound n on the number of possible plaintexts is helpful when invalid plaintexts serve as honeytokens, but these honeytokens can't be made implicit. If n is small enough, a trusted entity can explicitly store and watch for these honeytokens.

One example of a way to limit the number of honeymessages to some count n is to specify in the ciphertext c a set $K=\{\kappa_0, \ldots, \kappa_{n-1}\}$ of n possible keys. The true key $\kappa$ is placed in a random position $j \in_U \mathbb{Z}_n$, i.e., $\kappa_j \leftarrow \kappa$. All other keys in K are selected uniformly at random from K.

The function $\text{dec}^{HE}$ then outputs $\perp$ for any key $\kappa' \notin K$. With this construction, an adversary has probability 1/n of guessing the correct key in K.

Explicit specification of a key set K in this way requires storage linear in n. A simple optimization can reduce the required storage to constant size. Let $z: K \times \mathbb{Z}_n \to K$ be a pseudorandom function (PRF). Select a random key $y \in K$ and let $\Gamma = \kappa - z_y(i)$.

Then define $$K=\{\kappa_i = z_y(i) - \Gamma\}_{i=1}^n.$$

Here, $\Gamma$ plays a role analogous to that of the offset $\delta$ in the previously-described construction of FIGS. 2 and 3.

Embodiments of the invention implemented in the context of password vaults will now be described in more detail. It is to be appreciated, however, that other embodiments can be used in a wide variety of encryption and decryption contexts.

Password vaults are popular software applications for storing and protecting users' often large collections of passwords. Typically, a vault is itself encrypted under a password called a master password. The benefit to the user in this arrangement is that he or she need only remember this single secret to access all of his or her other passwords. A drawback is that an attacker that obtains the vault and cracks the master password similarly learns all of the user's passwords. This is a real risk, as users often pick weak passwords, particularly ones, like master passwords, that they use often. At the same time, vaults are increasingly stored en bloc in the cloud by services that support vault backup and synchronization.

In the embodiments to be described, it is assumed that the password vault includes an additional protection on top of the master password, in that the true password vault is hidden within a set of decoy vaults containing similarly formatted passwords. An example of a conventional arrangement of this type is referred to as Kamouflage, and is described in H. Bojinov et al., "Kamouflage: loss-resistant password management," in ESORICS, pp. 286-302, 2010, which is incorporated by reference herein. An attacker that successfully cracks one or more of these vaults still faces the challenge of determining which is correct. As all vaults are similarly formatted, this can be hard. Kamouflage requires storage linear in the total number n of vaults.

An embodiment will now be described that uses HE to reduce storage to constant size, potentially enabling use of very large n and thus strong hiding of a user's password vault. Such an embodiment can also achieve security and decryption speeds roughly equivalent to those of Kamouflage for a given n.

The Kamouflage system generates decoy passwords or honeywords from a password P in two stages. First, the password P is parsed into a sequence of tokens $T=t[1]\|\ldots\|t[v]$. We refer to the token sequence herein as a password syntax. The tokens in a syntax might be, for example, digit sequences, words, and strings of non-alphanumeric characters, respectively denoted $d_i$, $l_i$, and $s_i$ for length i. For example, the password gold5rings!!

would be parsed as $l_4\|d_1\|l_5\|s_2$. A honeyword is then generated by randomly replacing tokens with syntactically matching values from a predetermined lexicon, or list of possibilities, for each token type. For example, $l_4\|d_1\|l_5\|s_2$ might yield honeywords such as:

mice3blind:)

tool1crate(# vote4goats@$

Here, the words {"mice", "tool", "vote"} for instance, come from a lexicon $\text{lex}(l_4)$ of four-letter words for token $l_4$. Similarly, {':)', '(#', '@$'} come from a lexicon $\text{lex}(s_2)$.

A password vault is denoted as a collection of u passwords $V=(MP=P_0, P_1, \ldots, P_{u-1})$, where MP is a master password used to encrypt the passwords in the vault.

The Kamouflage system takes as input a valid user's password vault V and embeds it within a set of n−1 decoy vaults. We refer to the n−1 decoy vaults as "honeyvaults" and the full set of n vaults, including the true vault V, as "sweetvaults."

To create honeyvaults, the true vault V is parsed into a template T. Password $P_i$ is parsed into a syntax $T_i=\{t_i[0]\|t_i[1]\ldots\|t_i[v-1]\}$. Here, for simplicity, we assume that every password has exactly v tokens. Token sequences may be padded out with special "null" tokens representing no character substitutions. The result is a u×v matrix of tokens collectively comprising the template T. A honeyvault is constructed by randomly instantiating tokens from the template T.

Let $V=\{V^{(j)}\}_{j=0}^{n-1}$ denote the set of sweetvaults, where $V^{(j)}=\{MP^{(j)}=P_0^{(j)}, \ldots, P_{u-1}^{(j)}\}$. The true vault V is placed in a randomly selected position $k \in_U \mathbb{Z}_n$; thus $V^{(k)}=V$. All n−1 other vaults are honeyvaults.

Each vault is stored in encrypted form. In particular, the set of passwords $\{P_1^{(j)}, \ldots, P_{u-1}^{(j)}\}$ is encrypted under $MP^{(j)}=P_0^{(j)}$.

To decrypt a vault requires work n/2 on average over choices of k, as a master password MP must be tried against vaults in succession until the true vault $V^{(k)}$ is found.

The Kamouflage system as described in the above-cited H. Bojinov et al. reference can include thousands of sweetvaults, but incurs noticeable performance degradation for $n=10^4$ or greater.

We now describe the first step of an exemplary process for encrypting vaults using HE. This first step encrypts passwords. It leaves the template T exposed; step two of the process achieves encryption of T.

In what follows, T is slightly redefined to exclude the syntax of the master password; we now let $T=\{T_1, \ldots, T_{u-1}\}$. Given storage of the template T for V, it is possible to use HE to achieve an arbitrarily large number of honeyvaults with constant storage. It is also possible to avoid storing T explicitly. In this setting, a honeyvault is a honeymessage and M is the set of all vaults that match T.

In the present embodiment, the key-to-seed mapping function $f(\kappa)$ pseudorandomly generates seed s as a u×v array of values in [0,1]. Specifically, $f(\kappa)$ takes as input a key $\kappa=kd_\kappa$(MP), for some suitable choice of key derivation function $kd_\kappa$. Let $w(i,a,\kappa) \rightarrow [0,1]$ be a PRF. Then $f(\kappa)$ outputs a seed s such that $\{s_i[a]=w(i,a,\kappa)\}_{i\in[0,u-1],a\in[0,v-1]}$.

The seed-to-message mapping function g(s) fills in the template T to yield a vault V. Seed s specifies for each token t in T of a value or word to be filled in from its lexicon lex(t). For token $t_i[a]$, seed value $s_i[a]\in[0,1]$ selects an entry from the lexicon $lex(t_i[a])$ according to a probability distribution that estimates the frequencies of choices by a user population from the lexicon. Note that since MP is furnished as input to $f$ here, it is not generated from T.

Given this construction, any master password MP', whether or not correct, will generate a plaintext honeyvault matching template T. A correct master password MP will regenerate the original vault V.

Step two of our process, encryption of T, requires a partitioning of the space of possible master passwords MP into E disjoint subsets referred to as equivalence classes. An equivalence class encompasses passwords with identical syntax. An equivalence class thus serves conveniently as a compact representation of the valid and decoy passwords that decrypt or generate a given template T.

For step two of the process, we assume that MP is partitioned into equivalence classes $MP=MP_1 \cup \ldots, \cup MP_E$. It is assumed that there is an efficient way to compute a password's partition membership, i.e., to find i such that $MP \in MP_i$.

An exemplary approach to partitioning MP into equivalence classes is as follows. First partition every lexicon lex(t) into disjoint subsets, i.e., let $lex(t)=lex(t)_1 \cup lex(t)_2 \ldots, \cup \ldots lex(t)_a$. Assume for simplicity that a is identical for all lexica. Then, for every password syntax $T=t[1]\|\ldots\|t[v]$, there correspond equivalence classes defined such that a class contains all passwords that: (1) match syntax T and (2) instantiate each token $t[i]\in T$ from within a specific partition $lex(t[i])_{j_i}$ in lexicon lex(t[i]). In other words, passwords in the equivalence class instantiate tokens in T with choices from $lex(t[1])_{j_1} \times \ldots \times lex(t[v])_{j_v}$ for indices $j_1, \ldots, j_v \in \{1, \ldots, a\}$.

Revealing the template T can be dangerous in the sense that it makes it easier for an adversary to guess passwords. For example, if a password parses to $d_4$, an attacker knows that the password lies in the relatively small space of four-digit numbers. Such knowledge can help an adversary perform password cracking and online guessing attacks against passwords. Additionally, users often select master passwords of a format similar to their other passwords. So revealing the format of a vault can make the vault itself easier to crack.

We can protect T by encrypting it using a conventional cipher using its equivalence class e as a key. Specifically, we encrypt under a key $\lambda=kd(e)$ for a suitable key-derivation function kd.

Let (enc,dec) denote a conventional encryption process, either symmetric or asymmetric, that outputs ciphertexts of uniform length. And let $c=enc^{HE}(\kappa,V)$ be the ciphertext yielded by applying HE to V as above.

Then we construct a ciphertext of the form $$C=enc_\lambda(M=(T,c)),$$

Decrypting C with proffered master password MP' involves the following steps:

1. Derive key $\lambda$: Determine the partition index e such that $MP' \in MP_e$ and compute $\lambda=kd(e)$.
2. Decrypt C: Compute $M=(T,c)=dec_\lambda[C]$.
3. Decrypt c under HE to obtain vault V: Using T, compute $V=dec_\kappa^{HE}(c)$.

This process requires storage only of the single ciphertext C. With regard to security, it is infeasible for an adversary to learn any information about V without guessing e. Suppose that $n=|MP_e|$. Given a source distribution d on passwords, we might heuristically assume that the partitioning of MP assigns passwords of roughly equal weight in d to $MP_e$. In this case, a guessing attempt against C will succeed with probability at most $n \times pr_d(MP)$.

The probability of guessing the master password for a given sweetvault in Kamouflage is roughly $pr_d(MP)$. The incremental cost, however, of cracking other sweetvaults once one has been cracked is relatively low in Kamouflage, due to the fact that all master passwords have identical syntax.

Accordingly, given a key-derivation function kd that slows decryption in our process by a factor of n, we achieve security roughly equivalent to that of Kamouflage, in the sense of resistance to discovery of the set of sweetvaults for V. Decryption in our process, then, requires time equal to the worst-case time of Kamouflage and close to twice its expected decryption time.

Additionally, our approach permits a service provider to detect compromise of a user's vault via implicit honeywords.

In another embodiment, it is possible to protect T itself using HE, rather than ordinary encryption. This approach could in principle achieve stronger encryption of V than Kamouflage, still with constant storage.

Construction of an HE algorithm for templates in a user population, though, may be based on knowledge of the distribution $d_T$ of templates for vaults generated by the population. In contrast to individual passwords, whose composition by typical users is relatively well studied, the lack of public databases of full, leaked vaults means that there is little understanding of how users typically choose batches of passwords, as in vaults.

In this case, in addition to the HE process ($enc^{HE},dec^{HE}$) for encryption of V, another HE process, ($enc^{HE2},dec^{HE2}$), is used for encryption of T.

Construction of a good mapping g in this case is ideally based on an understanding of the source distribution d of vault templates T.

On the other hand, a function g that doesn't model d perfectly, but outputs many plausible vaults, can still provide strong security.

An exemplary function g for ($enc^{HE2},dec^{HE2}$) for generating a template T' will now be described. It aims to capture the similarities among the password choices of most users, including similarities between MP and other passwords. The idea is to generate a small set of password syntaxes by "perturbing" the syntax for MP. The syntaxes in this small set are then assigned to random positions in T'.

The function is illustrated configured as follows:
Algorithm: $g(s') \rightarrow T'$
1. Parse the master password MP, yielding syntax $T=t[1]\|\ldots\|t[v]$.
2. Randomly pick a number $U \in_{d_U} \mathbb{Z}$ of unique passwords, $P_1', \ldots, P_U'$.
3. Perturb the syntax for each password $P_i'$:
   Randomly pick a number of perturbations $B \in_{d_B} \mathbb{Z}$.
   Assign syntax $T_i' \leftarrow T$ to $P_i'$.
   Apply B perturbations to $T_i'$.
4. Assign syntaxes to T: For each syntax $T_i \in T$, choose $T' \in_U \{T_j'\}_{j=1}^U$, and set $T_i \leftarrow T'$.

Realistic choices of distributions $d_U$ and $d_B$ may be derived from additional surveying of user password choices.

Examples of perturbations that may be used include modifying a token by substituting a different token (possibly including the "null" token), e.g., changing a $d_2$ (pair of digits)

into an $s_4$ (pair of special characters), and modifying the length of a token, e.g., changing an $l_4$ (four-letter word) into a $d_3$ (three-letter word). User modification to password syntax might be treated as a Markov model.

A seed may comprise a fixed-sized array of probabilities. A possible additive group is one that sums seeds (with "wrap-around") in identical array positions.

Service providers that store password vaults on behalf of their users can, in principle, protect these vaults by sending them only to a user's registered devices, relying on the master password to provide on-device confidentiality. To prevent offline cracking of vaults by an adversary that manages to associate a device falsely with a user's account and download his or her vault, the service may perform online checking of MP.

Storage of h(MP), however, would expose MP to a hash-cracking attack and thus negate the value of HE on vaults in the case of provider compromise. Instead, in our process involving ordinary encryption of T, the provider might instead store $h(\lambda)$, a hash of the key $\lambda$ representing MP's equivalence class e. To download V, then, an attacker must guess e. An attacker that compromises the provider must crack $h(\lambda)$ to learn e, a task as hard as obtaining e from the encrypted vault C.

An alternative or complement to the use of templates in applying HE to vaults is to permute the web sites or other account names associated with passwords. We then encrypt using HE a permutation $\pi$ mapping passwords to account names in the vault. One way to protect a vault is to encrypt passwords under an equivalence class e using ordinary encryption and $\pi$ under the master password MP using HE.

In some cases, users may produce vaults or passwords that stand out as much more probable than honeymessage alternatives. For example, some users adopt the password composition formula R||X for website X, where R is a "root" password employed across multiple sites. In this case, an HE process on the permutation $\pi$ would be ineffective, in that for any vault V* that contains a password of the form R||X' for website X, $pr_d(V^*) \approx 0$. One way to address this issue is simply to reject passwords of such form. Another is for the vault to identify passwords of this form and to apply syntax-based HE to R, leaving X unchanged.

Some password vaults generate strong, random passwords on request for users. For such passwords, password syntax is just an artifact of the generation process, and doesn't reflect user password-selection behavior. As such, syntax-based HE isn't applicable. Instead, a password may be specified in a password space P pseudorandomly by a key $\sigma \in_U \Sigma = \{0,1\}^l$ using a PRF $z(\sigma) \to P$. Then HE may be applied straightforwardly to $\sigma$, and the password reconstituted using $z(\sigma)$ upon vault reconstruction.

As indicated above, other embodiments can be implemented outside of the password vault context. For example, a number of tools are available to protect corporate data, including e-mail, documents, contacts and so forth, on personal devices within compartments called "containers." It is a common policy to require users to encrypt containers under passwords to protect against compromise in case of device loss. HE can provide additional protection in this context, although a challenge is finding a good generation function for semantically complex content such as e-mail messages. It is possible, though, to apply HE not to entire documents, but instead only to portions that are particularly sensitive and amenable to generation of plausible decoys. For example, HE might be applied to monetary amounts in spreadsheets, to e-mail addresses in contact lists, etc.

The HE techniques disclosed herein can also be adapted for use in protecting symmetric keys. Keys are typically l-bit random bitstrings; thus a natural choice is $S=M=\{0,1\}^l$ and $g(s)=s$. HE can't be applied to private keys, of course, where corresponding public keys are available. Where they aren't, HE may be applied straightforwardly to protection of keys for discrete-log-based systems. Protection of RSA private keys may be accomplished by applying HE to a pseudorandom seed used to generate the private key.

In other embodiments, the HE constructions described previously may be varied. In one such variation, the generation function g can involve online resources. These can be useful in creating plausible messages. For example, a contact might be generated from a numeric seed that specifies a social network identity (e.g., a Facebook numeric ID). Online generation functions can also help throttle guessing attempts. For example, a resource might be stored in an online account, with its URL and password encrypted under HE.

In another possible variant, incorrect decryption results in HE may be deployed as honeytokens and serve to detect compromises of HE ciphertexts.

Consider, for example, the HE process for password vaults described above. A service provider holding password P from the user's vault can of course compute the syntax of P. If the provider knows the structure of equivalence classes over a user's vault, the provider can determine whether a submitted password P' represents a honeyword equivalent to P, i.e., represents the result of a decryption of V under an invalid master password.

In principle, equivalence classes can be defined identically for all vaults, and thus published. Consequently, service providers can detect possible honeyword submission without any special coordination with the user or password-vault service. Removing the need for such coordination provides a distinct advantage over Kamouflage, for which explicit transmission of honeywords to service providers is suggested as a system option.

HE beneficially hides a true plaintext message m by yielding a honeymessage with high probability under decryption with any incorrect key $\kappa'$. The ability to decrypt for any key $\kappa'$, however, can be a drawback in settings where keys derive from secrets manually entered (e.g., typed) by users.

For example, suppose that a user applies HE to encrypt an address book with telephone numbers under a password. If he or she enters the wrong password due to a typo or erroneous autocorrection, he or she will obtain valid-looking but wrong telephone numbers and may not realize it.

Using error-detecting codes, it is possible to achieve "typo safety," in which slight variants to $\kappa$, such as those introduced by typos, may be flagged and invalidated. As a simple example, for password P, a check value h(P)mod 100 might be stored alongside an HE ciphertext encrypted under P. 99% of incorrect passwords, then, may be detected at the time of entry. Of course, in this case, an attacker too can rule out 99% of possible passwords as invalid. In general, the stronger the error-detecting code, the better the typo safety, but the smaller the space of honeymessages.

More sophisticated codes, though, can detect the most common errors, such as mistyped characters and character transpositions. For example, book serial numbers, known as ISBNs, famously include a mod-11 check digit that detects a single typo or digit transposition.

In the case of password vaults utilizing equivalence classes of the type described herein, there is a good alternative or complement to the checksum-based approach to typo safety. We can construct equivalence classes such that the class of a master password itself serves as an error-detection value (e.g., checksum). That is, if master password MP belongs to a given equivalence class e, a mistyping MP'≠MP with a different checksum will also yield a different equivalence class e' e, and thus a decryption failure.

The above-described equivalence class construction based on partitioning of lexica can detect typographical errors. Take $lex(d_2)$, for example, the lexicon containing pairs of digits. Adopting the ISBN checksum technique mentioned above, for some prime q (e.g., q=11), one can place the value X∈lex $(d_2)$ in partition X mod q. X's partition, then, serves as a checksum, in that any single-digit error or digit transposition of X belongs to a different partition.

As mentioned previously, HE in some embodiments may be viewed as a form of information-theoretic encryption, in that it relies fundamentally not on computational hardness assumptions, but an adversary's ability to verify use of a correct decryption key.

Low-entropy secrets such as passwords are likely to persist in computer systems for many years. Their use for encryption leaves resources vulnerable to offline attack. HE as described herein can offer valuable additional protection in such scenarios. It yields plausible looking plaintexts under decryption with invalid keys, so that offline decryption attempts alone are insufficient to discover the correct plaintext.

It is possible to achieve protections similar to those of HE by explicitly encrypting decoy messages. This approach results in storage overhead linear in the total number of messages n. HE, in contrast, achieves constant storage requirements for increasing n, and generally little more storage than that required for ordinary encryption. HE has additional benefits too, such as facilitating detection by service providers of stolen ciphertexts via implicit honeytokens.

Moreover, due to its ability to support large numbers n of honeymessages, HE can provide strong security benefits even when only a small fraction of these messages are plausible.

The particular encryption and decryption processing operations and other system functionality described in conjunction with the embodiments described in conjunction with FIGS. 2-4 and elsewhere herein are presented by way of illustrative example only, and should not be construed as limiting the scope of the invention in any way. Alternative embodiments can use other types of processing operations for implementing encryption and decryption functions using the techniques disclosed herein.

Encryption and decryption functionality such as that described in conjunction with FIGS. 2-4 can be implemented at least in part in the form of one or more software programs stored in memory and executed by a processor of a processing device such as a mobile telephone or computer. As mentioned previously, a memory or other storage device having such program code embodied therein is an example of what is more generally referred to herein as a "processor-readable storage medium."

It should again be emphasized that the above-described embodiments of the invention are presented for purposes of illustration only. Many variations and other alternative embodiments may be used. For example, the techniques are applicable to a wide variety of other types of devices and systems that can benefit from enhanced security in encryption and decryption using low-entropy keys or other types of keys as disclosed herein. Also, the particular configuration of messages, ciphertexts, seeds, keys, key-to-seed mapping functions, seed-to-message mapping functions and other functions, and the associated encryption and decryption operations, can be varied in other embodiments. Moreover, the various simplifying assumptions made above in the course of describing the illustrative embodiments should also be viewed as exemplary rather than as requirements or limitations of the invention, and need not apply in other embodiments. Numerous other alternative embodiments within the scope of the appended claims will be readily apparent to those skilled in the art.

What is claimed is:

1. A method comprising:
obtaining a first message; and
encrypting the first message to produce a ciphertext;
wherein encrypting the first message comprises mapping a first key to a first seed, mapping the first message to a second seed, determining an offset between the first and second seeds, and generating the ciphertext based on the determined offset;
wherein the first message is encrypted such that decryption of the ciphertext utilizing the first key yields the first message and decryption of the ciphertext utilizing a second key different than the first key yields a second message that is distinct from the first message but shares one or more designated characteristics with the first message in a manner that prevents an attacker from determining solely from the second message if decryption of the ciphertext has been successful or unsuccessful; and
wherein the obtaining and encrypting are performed by at least one processing device comprising a processor coupled to a memory.

2. The method of claim 1 wherein the first and second keys comprise respective valid and invalid low-entropy keys.

3. The method of claim 1 wherein decryption of the ciphertext utilizing respective ones of a plurality of additional keys different than the first key yields respective additional messages that are distinct from the first message but share designated characteristics with the first message in a manner that prevents an attacker from determining solely from a given one of the additional messages if decryption of the ciphertext has been successful or unsuccessful, and wherein an increase in a maximum number of additional messages does not require any increase in a size of the ciphertext.

4. The method of claim 1 wherein the first message comprises a valid password vault comprising a plurality of passwords, the first key comprises a master password of the password vault and the second message comprises an invalid password vault that is configured to appear valid to an attacker.

5. The method of claim 1 wherein the first message comprises a template utilized to generate multiple invalid password vaults.

6. The method of claim 1 further comprising the steps of:
partitioning a password space into multiple equivalence classes such that each equivalence class comprises passwords having a common password syntax; and
generating keys for respective ones of the equivalence classes;
wherein the ciphertext is generated at least in part utilizing a key generated for a particular one of the equivalence classes.

7. The method of claim 1 wherein the first message comprises a permutation utilized to map passwords to accounts in a password vault, the first key comprises a master password of the password vault and the second message comprises an invalid permutation that is configured to appear valid to an attacker.

8. The method of claim 1 wherein the first message comprises a key utilized to select a password from a password space.

9. A method comprising:
obtaining a first message; and
encrypting the first message to produce a ciphertext;
wherein the ciphertext comprises an offset between a first seed associated with the first message and another seed generated by applying a key-to-seed mapping to a first key;
wherein the first message is encrypted such that decryption of the ciphertext utilizing the first key yields the first message and decryption of the ciphertext utilizing a second key different than the first key yields a second message that is distinct from the first message but shares one or more designated characteristics with the first message in a manner that prevents an attacker from determining solely from the second message if decryption of the ciphertext has been successful or unsuccessful; and
wherein the obtaining and encrypting are performed by at least one processing device comprising a processor coupled to a memory.

10. The method of claim 9 wherein the ciphertext is of the form $(\delta,x)$ where $\delta=\hat{g}^{-1}(m)-f_x(\kappa)$ denotes the offset, m denotes the first message, $\hat{g}^{-1}(m)$ denotes a message-to-seed mapping, $\kappa$ denotes the first key, $f_x(\kappa)$ denotes the key-to-seed mapping and x denotes a supplementary key utilized by the key-to-seed mapping.

11. The method of claim 10 wherein the message-to-seed mapping $g^{-1}(m)$ is implemented as a function that determines multiple seeds that each map to m and then selects a particular one of the multiple seeds.

12. The method of claim 10 wherein the supplementary key is selected independently from a designated key space for each of a plurality of iterations of said encrypting.

13. The method of claim 10 wherein the key-to-seed mapping comprises at least one of a hash function and a pseudorandom permutation.

14. An article of manufacture comprising a non-transitory processor-readable storage medium having embodied therein one or more software programs, wherein the one or more software programs when executed by at least one processing device cause said at least one processing device:
to obtain a first message; and
to encrypt the first message to produce a ciphertext;
wherein encrypting the first message comprises mapping a first key to a first seed, mapping the first message to a second seed, determining an offset between the first and second seeds, and generating the ciphertext based on the determined offset; and
wherein the first message is encrypted such that decryption of the ciphertext utilizing the first key yields the first message and decryption of the ciphertext utilizing a second key different than the first key yields a second message that is distinct from the first message but shares one or more designated characteristics with the first message in a manner that prevents an attacker from determining solely from the second message if decryption of the ciphertext has been successful or unsuccessful.

15. An apparatus comprising:
at least one processing device comprising a processor coupled to a memory;
wherein said at least one processing device is configured to obtain a first message and to encrypt the first message to produce a ciphertext;
wherein encrypting the first message comprises mapping a first key to a first seed, mapping the first message to a second seed, determining an offset between the first and second seeds, and generating the ciphertext based on the determined offset; and
wherein the first message is encrypted such that decryption of the ciphertext utilizing the first key yields the first message and decryption of the ciphertext utilizing a second key different than the first key yields a second message that is distinct from the first message but shares one or more designated characteristics with the first message in a manner that prevents an attacker from determining solely from the second message if decryption of the ciphertext has been successful or unsuccessful.

16. The apparatus of claim 15 wherein the ciphertext is of the form $(\delta,x)$ where $\delta=\hat{g}^{-1}(m)-f_x(\kappa)$ denotes the offset, m denotes the first message, $\hat{g}^{-1}(m)$ denotes a message-to-seed mapping, $\kappa$ denotes the first key, $f_x(\kappa)$ denotes a key-to-seed mapping and x denotes a supplementary key utilized by the key-to-seed mapping.

17. A method comprising:
obtaining a ciphertext; and
decrypting the ciphertext to produce a first message;
wherein the first message results from decrypting the ciphertext using a first key;
wherein decrypting the ciphertext to produce the first message comprises mapping the first key to a first seed, applying an offset of the ciphertext to the first seed to generate a second seed, and mapping the second seed to the first message;
wherein the ciphertext is configured such that decryption of the ciphertext utilizing a second key different than the first key yields a second message that is distinct from the first message but shares one or more designated characteristics with the first message in a manner that prevents an attacker from determining solely from the second message if decryption of the ciphertext has been successful or unsuccessful; and
wherein the obtaining and decrypting are performed by at least one processing device comprising a processor coupled to a memory.

18. The method of claim 17 wherein decrypting the ciphertext to produce the first message comprises computing $m=g(f_x(\kappa)+\delta)$ where m denotes the first message, $\delta$ denotes the offset, g denotes a seed-to-message mapping, $\kappa$ denotes the first key, $f_x(\kappa)$ denotes a key-to-seed mapping and x denotes a supplementary key utilized by the key-to-seed mapping.

19. An article of manufacture comprising a non-transitory processor-readable storage medium having embodied therein one or more software programs, wherein the one or more software programs when executed by at least one processing device cause said at least one processing device:
to obtain a ciphertext; and
to decrypt the ciphertext to produce a first message;
wherein the first message results from decrypting the ciphertext using a first key;
wherein decrypting the ciphertext to produce the first message comprises mapping the first key to a first seed, applying an offset of the ciphertext to the first seed to generate a second seed, and mapping the second seed to the first message; and
wherein the ciphertext is configured such that decryption of the ciphertext utilizing a second key different than the first key yields a second message that is distinct from the first message but shares one or more designated characteristics with the first message in a manner that prevents an attacker from determining solely from the second message if decryption of the ciphertext has been successful or unsuccessful.

20. The article of manufacture of claim 19 wherein decrypting the ciphertext to produce the first message comprises computing $m=g(f_x(\kappa)+\delta)$ where m denotes the first message, $\delta$ denotes the offset, g denotes a seed-to-message mapping, $\kappa$ denotes the first key, $f_x(\kappa)$ denotes a key-to-seed mapping and x denotes a supplementary key utilized by the key-to-seed mapping.

* * * * *